US011932026B2

(12) United States Patent
Kubota et al.

(10) Patent No.: US 11,932,026 B2
(45) Date of Patent: Mar. 19, 2024

(54) HEAD UNIT AND PRINTING UNIT

(71) Applicant: TOPPAN INC., Tokyo (JP)

(72) Inventors: Masashi Kubota, Tokyo (JP); Tomoyuki Marugame, Tokyo (JP)

(73) Assignee: TOPPAN INC., Tokyo (JP)

( * ) Notice: Subject to any disclaimer, the term of this patent is extended or adjusted under 35 U.S.C. 154(b) by 273 days.

(21) Appl. No.: 17/554,039

(22) Filed: Dec. 17, 2021

(65) Prior Publication Data

US 2022/0105732 A1 Apr. 7, 2022

Related U.S. Application Data

(63) Continuation of application No. PCT/JP2019/024265, filed on Jun. 19, 2019.

(51) Int. Cl.
*B41J 2/33* (2006.01)
*B41J 2/335* (2006.01)
*B41J 11/04* (2006.01)

(52) U.S. Cl.
CPC ............... *B41J 2/33* (2013.01); *B41J 2/3354* (2013.01); *B41J 11/04* (2013.01)

(58) Field of Classification Search
CPC ... B41J 2/33; B41J 2/3354; B41J 11/04; B41J 17/02; B41J 2/315; B41J 2/32; B41J 2/325; B41F 16/00; B41F 16/0006; B41M 5/0041; B41M 5/0052
See application file for complete search history.

(56) References Cited

U.S. PATENT DOCUMENTS

| | | | | |
|---|---|---|---|---|
| 6,583,804 | B2 * | 6/2003 | Miyazaki | B41J 2/315 347/218 |
| 6,734,887 | B2 * | 5/2004 | Field | B41J 2/325 347/171 |
| 2016/0332476 | A1 | 11/2016 | Inokuchi | |
| 2018/0178546 | A1 * | 6/2018 | Ashizawa | B41J 11/42 |

FOREIGN PATENT DOCUMENTS

| | | | | |
|---|---|---|---|---|
| CN | 105939868 A | | 9/2016 | |
| EP | 1013463 A2 | * | 6/2000 | B41M 3/144 |
| JP | H08-099486 A | | 4/1996 | |
| JP | 2004-237688 A | | 8/2004 | |
| JP | 2012-173464 A | | 9/2012 | |
| JP | 2016-124279 A | | 7/2016 | |

OTHER PUBLICATIONS

Chinese Office Action issued in connection with CN Appl. Ser. No. 201980097424.5 dated Oct. 26, 2022 (10 pages).

(Continued)

*Primary Examiner* — Kristal Feggins
(74) *Attorney, Agent, or Firm* — Foley & Lardner LLP

(57) ABSTRACT

A head unit is used for production of a media sheet that has a medium region row including a plurality of medium regions, the medium regions being to be separate personal information media. The head unit includes a plurality of thermal heads configured to thermally transfer dots exhibiting a structural color from a ribbon to a target. The plurality of thermal heads are arranged so that each thermal head corresponds to a respective one of the medium regions constituting the medium region row.

5 Claims, 10 Drawing Sheets

(56) References Cited

OTHER PUBLICATIONS

Chinese Office Action issued in connection with CN Appl. Ser. No. 201980097424.5 dated Jun. 10, 2023.

International Searching Authority, "International Search Report," issued in connection with International Patent Application No. PCT/JP2019/024265 dated Aug. 13, 32019, 5 pages.

International Searching Authority, "Written Opinion," issued in connection with International Patent Application No. PCT/JP2019/024265 dated Aug. 13, 32019, 4 pages.

* cited by examiner

HEAD UNIT AND PRINTING UNIT

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/024265, filed on Jun. 19, 2019, the disclosure of which is incorporated herein by reference in its entirety.

TECHNICAL FIELD

The present invention relates to a head unit used for production of personal information media, and a printing unit.

BACKGROUND

A personal information medium such as an ID card has a region that displays personal information such as the name and facial image of the owner. In recent years, in order to prevent counterfeiting of personal information media, forming the areas indicating personal information to exhibit a structural color has been proposed. The structural color is visually recognized through optical phenomena such as optical diffraction or interference resulting from microstructures of objects. An area exhibiting structural color is formed by thermal transfer printing using a transfer ribbon with a layer of a microstructure such as a diffraction grating (for example, refer to PTL 1).

CITATION LIST

Patent Literature

PTL 1: JP 2016-124279 A

SUMMARY OF THE INVENTION

Technical Problem

The production of the transfer ribbon requires formation of a microstructure such as a diffraction grating, so that the unit price of the transfer ribbon is higher than general ink ribbons. Therefore, it is desired to suppress the wasteful usage of the transfer ribbon in production of personal information media. In particular, reducing the usage of the transfer ribbon is an important issue in producing a large number of personal information media. This is because, even if only a small amount of a transfer ribbon is wasted in production of a single personal information medium, a massive amount of transfer ribbon will be consumed in the production of a large number of personal information media.

The present invention is intended to provide a head unit that can reduce the usage of a transfer ribbon, and a printing unit.

Solution to Problem

A head unit to solve the above-mentioned issue is a head unit used for production of a media sheet that has a medium region row including a plurality of medium regions, the medium regions providing separate personal information media. The head unit includes a plurality of thermal heads configured to thermally transfer a dot exhibiting a structural color from a ribbon to a target, and the plurality of thermal heads are arranged so that each thermal head corresponds to a respective one of the medium regions constituting the medium region row.

A printing unit to solve the above-mentioned issue includes: the head unit; platen rollers facing the thermal heads; and a ribbon transport module configured to transport the ribbon through between the thermal heads and the platen rollers.

According to the above-described configuration, the separate thermal heads perform printing in the medium regions constituting the row. This makes it possible to use a ribbon of a small width at the same level as or a smaller width than the width of the medium regions, in comparison to a mode in which one thermal head has a length corresponding to a plurality of medium regions and a ribbon of a length corresponding to the plurality of medium regions is used to perform printing collectively in the plurality of medium regions. By performing printing with a ribbon of a small width arranged for each of the thermal heads, it is possible to suppress wasteful consumption of the ribbon at a part between adjacent medium regions, in comparison to the above-described mode in which printing is performed collectively in the plurality of medium regions. Employing the above-described configuration in a mode in which a plurality of personal information media are collectively produced from one media sheet makes it possible to reduce the usage of the ribbon in producing a large number of personal information media, thereby achieving high effectiveness of reducing the usage of the ribbon.

In the above-described configuration, the ribbon transport module may be configured to transport a ribbon of a larger width than the length of a row of resistive heating elements included in the thermal heads.

According to the above-described configuration, at the time of transfer, the resistive heating elements can be suppressed from contacting a transfer target sheet outside the ribbon. This makes it possible to suppress the sheet from becoming damaged.

In the above-described configuration, the plurality of thermal heads may constitute a head row, and the head unit may include a plurality of the head rows aligned in parallel.

According to the above-described configuration, performing printing in the medium regions using the plurality of head rows makes it possible to increase the number of sheets printable by the printing unit per unit time.

In the above-described configuration, the thermal heads may be used for printing facial images in the medium regions.

The personal information media having facial images as personal information have high effectiveness in anti-counterfeiting. According to the above-described configuration, it is possible to reduce the usage of the ribbon in producing a large number of personal information media with high effectiveness in anti-counterfeiting.

Advantageous Effects of the Invention

According to the present invention, it is possible to reduce the usage of a transfer ribbon.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

Embodiments of a head unit and a printing unit will be described with reference to FIGS. 1 to 14.

[Personal Information Medium and Media Sheet]

Figure 1:
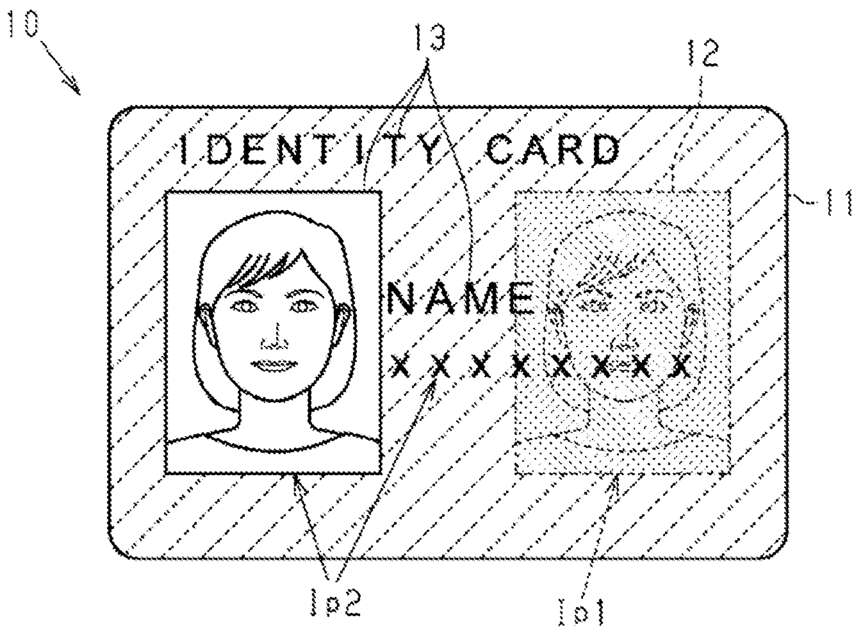
FIG. 1 is a diagram illustrating a configuration of a personal information medium as a final product according to an embodiment of a printing unit.

Referring to FIG. 1, a configuration of a personal information medium produced by using a printing system including a printing unit in the present embodiment will be described. As illustrated in FIG. 1, a personal information medium 10 has a card shape. The personal information medium 10 is embodied, for example, as an ID card for identifying the holder.

The personal information medium 10 includes a support body 11, a structural color portion 12, and a pigmented portion 13. The structural color portion 12 and the pigmented portion 13 are positioned on the front side of the support body 11. The structural color portion 12 exhibits a structural color that is visually recognized through optical phenomena such as reflection, diffraction, and interference resulting from a microstructure of an object. That is, the color visually recognized at the structural color portion 12 varies depending on the angle of observation. In an example of the present embodiment, the structural color portion 12 is a part with a hologram formed. The structural color portion 12 is formed by thermal transfer printing.

The pigmented portion 13 exhibits colors produced by pigments. That is, the colors visually recognized at the pigmented portion 13 result from absorption of light by the pigments. The pigmented portion 13 is formed by fixing toner or ink onto the support body 11 using a printing method.

The support body 11 is made of a material capable of forming the structural color portion 12 and the pigmented portion 13 thereon. For example, the support body 11 is made of a resin such as polyethylene terephthalate.

The structural color portion 12 includes a part indicating first personal information Ip1, and the pigmented portion 13 includes parts indicating second personal information Ip2. That is, the personal information medium 10 has a combination of the first personal information Ip1 and the second personal information Ip2. The first personal information Ip1 and the second personal information Ip2 are personal information on the same person, specifically, personal information on the person to be the holder of the personal information medium 10. The personal information in the present embodiment is information usable for identifying a person, which includes, for example, the person's name, birth date, address, facial image, and the like. In an instance example of the present embodiment, the first personal information Ip1 and the second personal information Ip2 each include a color facial image.

The structural color portion 12 and the pigmented portion 13 may include, besides the parts indicating the personal information Ip1 and Ip2, characters, symbols, graphics, patterns, and the like indicating information different from the personal information. The personal information medium 10 may further include layers different from the layers of the support body 11, the structural color portion 12, and the pigmented portion 13, such as a protective layer covering the structural color portion 12 and the pigmented portion 13 and a layer for enhancing the strength of the personal information medium 10.

Figure 2:
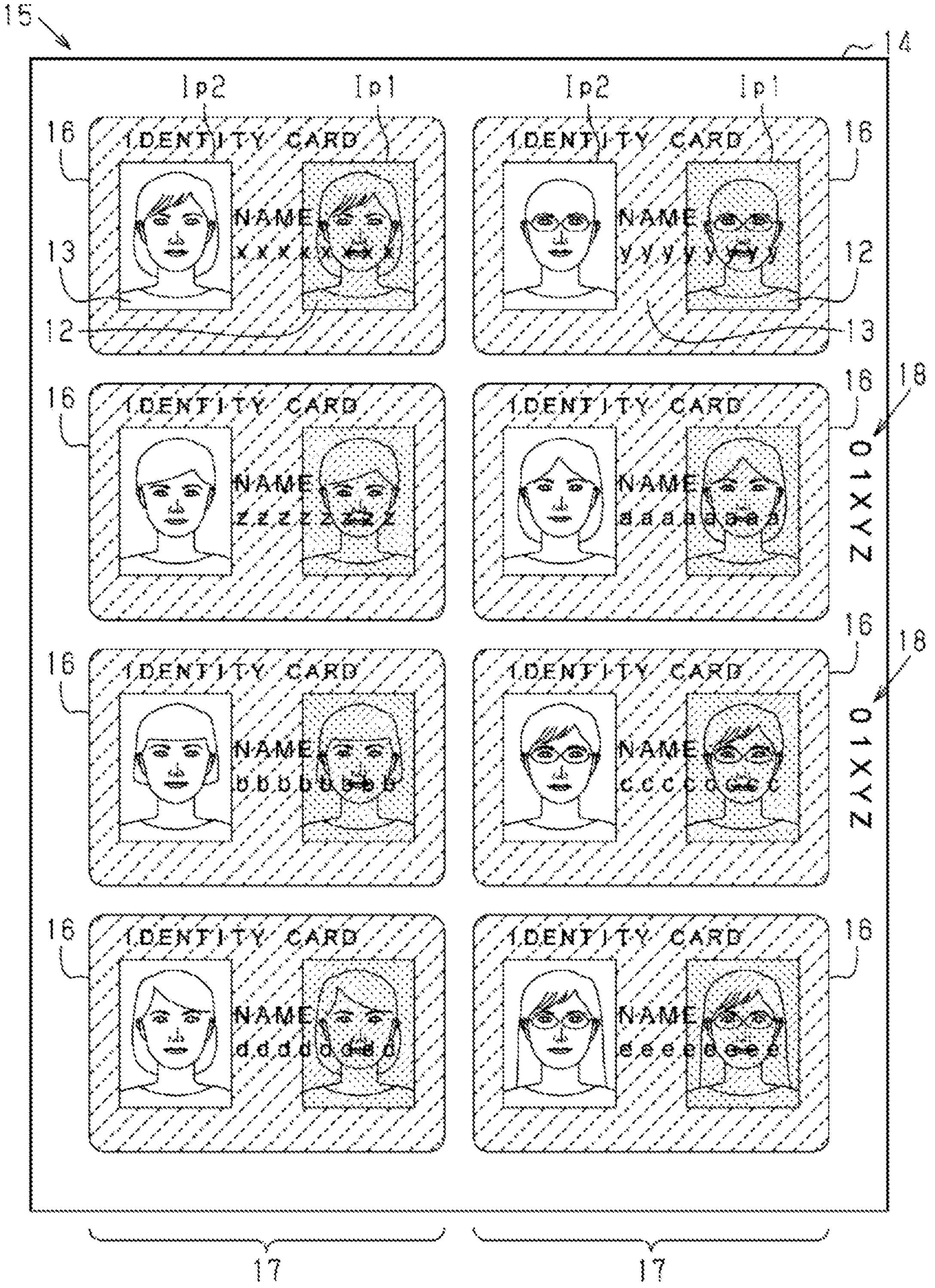
FIG. 2 is a diagram illustrating a configuration of a media sheet to be produced by a printing system including the printing unit in the embodiment.

FIG. 2 illustrates a media sheet produced by a printing system of the present embodiment. In the present embodiment, a plurality of personal information media 10 are produced using multiple imposition. As illustrated in FIG. 2, a media sheet 15 has a plurality of medium regions 16. The medium regions 16 are areas to be the personal information media 10, and the medium regions 16 constitute separate personal information media 10. That is, the plurality of medium regions 16 become personal information media 10 for different individuals.

In detail, the media sheet 15 has one or more medium region rows 17. One medium region row 17 is formed of two or more medium regions 16. In an example of the present embodiment, the media sheet 15 has two medium region rows 17, and each of the medium region rows 17 is formed of four medium regions 16. That is, the media sheet 15 includes eight medium regions 16 in two rows, and the personal information media 10 for eight persons are formed from one media sheet 15.

The media sheet 15 is configured such that the structural color portions 12 and the pigmented portions 13 corresponding to the plurality of personal information media 10, that is, the structural color portions 12 and the pigmented portions 13 in the individual medium regions 16 are formed on a large-sized base sheet 14 made of a material constituting the support body 11. In the media sheet 15 produced, each medium region 16 includes first personal information Ip1 and second personal information Ip2. The personal information Ip1 and the personal information Ip2 included in the medium regions 16 are information on persons different among the medium regions 16.

The media sheet 15 includes two ID portions 18 outside the medium regions 16. Each ID portion 18 is a region in which an information group ID is printed. The information group ID is identification information assigned to a group of pieces of first personal information Ip1 and a group of pieces of second personal information Ip2 included in one media sheet 15. In other words, one information group ID is assigned to a combination of a plurality of personal information media 10 formed from one media sheet 15. The information group ID is printed, for example, as a number or character string.

A first information group Gi1 as a group of the first personal information Ip1 is formed of all pieces of the first personal information Ip1 included in one media sheet 15. A second information group Gi2 as a group of the second personal information Ip2 is formed of all pieces of the second personal information Ip2 included in one media sheet 15. If the media sheet 15 includes eight medium regions 16, the first information group Gi1 is formed of the first personal information Ip1 on eight persons, and the second information group Gi2 is formed of the second personal information Ip2 on the eight persons.

The information group IDs indicated by the ID portions 18 at two places are identical. Each of the ID portions 18 is located alongside one of the medium regions 16 in one medium region row 17. In other words, each of the information group IDs is disposed alongside one of the medium regions 16 in a direction orthogonal to the direction in which the medium region rows 17 extend, that is, in a direction in which the medium region rows 17 are arranged in a row. The two ID portions 18 are arranged next to different medium regions 16 in one medium region row 17. For example, referring to FIG. 2, one of the two ID portions 18 aligns with the second medium region 16 from the top, and the other of the two ID portions 18 aligns with the third medium region 16 from the top. The ID portions 18 may be positioned at an end or center of the media sheet 15 as long as they are arranged next to the medium regions 16.

[Schematic Configuration of a Printing System]

Figure 3:
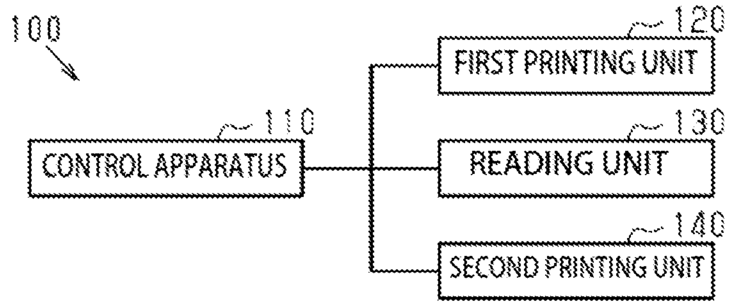
FIG. 3 is a diagram illustrating a schematic configuration of the printing system in the embodiment.

As illustrated in FIG. 3, a printing system 100 includes a control apparatus 110, a first printing unit 120, a reading unit 130, and a second printing unit 140.

The first printing unit 120 performs printing using a material exhibiting a structural color. Specifically, the first printing unit 120 forms the structural color portions 12 and the ID portions 18 on the base sheet 14 by thermal transfer using a hologram ribbon. The first printing unit 120 includes thermal heads and serves as a thermal printer.

The reading unit 130 receives from the first printing unit 120 a sheet body that is the media sheet 15 midway under the process of production, that is, receives the base sheet 14 on which the first printing unit 120 has performed printing, and reads the information group ID printed on the sheet body. Then, the reading unit 130 passes the sheet body to the second printing unit 140.

The second printing unit 140 performs printing using a material containing pigments. Specifically, the second printing unit 140 forms the pigmented portions 13 on the sheet body by printing with a coloring material such as toner or ink. The configuration of the second printing unit 140 is not particularly limited as long as it serves as a printer using a coloring material. For example, the second printing unit 140 serves as a laser printer or an ink-jet printer. In order to produce the media sheet 15 in volume, a laser printer serving as the second printing unit 140 is preferably used.

The control apparatus 110 is a computer device that communicates with the first printing unit 120, the reading unit 130, and the second printing unit 140. The control apparatus 110 manages data for formation of the media sheet 15, and controls the production of the media sheet 15 by the personal information medium 100 through outputting of data to the first printing unit 120 and outputting of data to the second printing unit 140. The control apparatus 110 outputs data for printing to the second printing unit 140, based on the reading of the information group ID by the reading unit 130.

After the formation of the media sheet 15 by the personal information medium 100, layers such as a protective layer are laminated on the media sheet 15. Then, the media sheet 15 is cut and divided into individual medium regions 16. Accordingly, the medium regions 16 constitute the personal information medium 10, whereby the production of the personal information media 10 is completed.

[Detailed Configuration of the First Printing Unit]

A detailed configuration of the first printing unit 120 will be described with reference to FIGS. 4 to 7.

Figure 4:
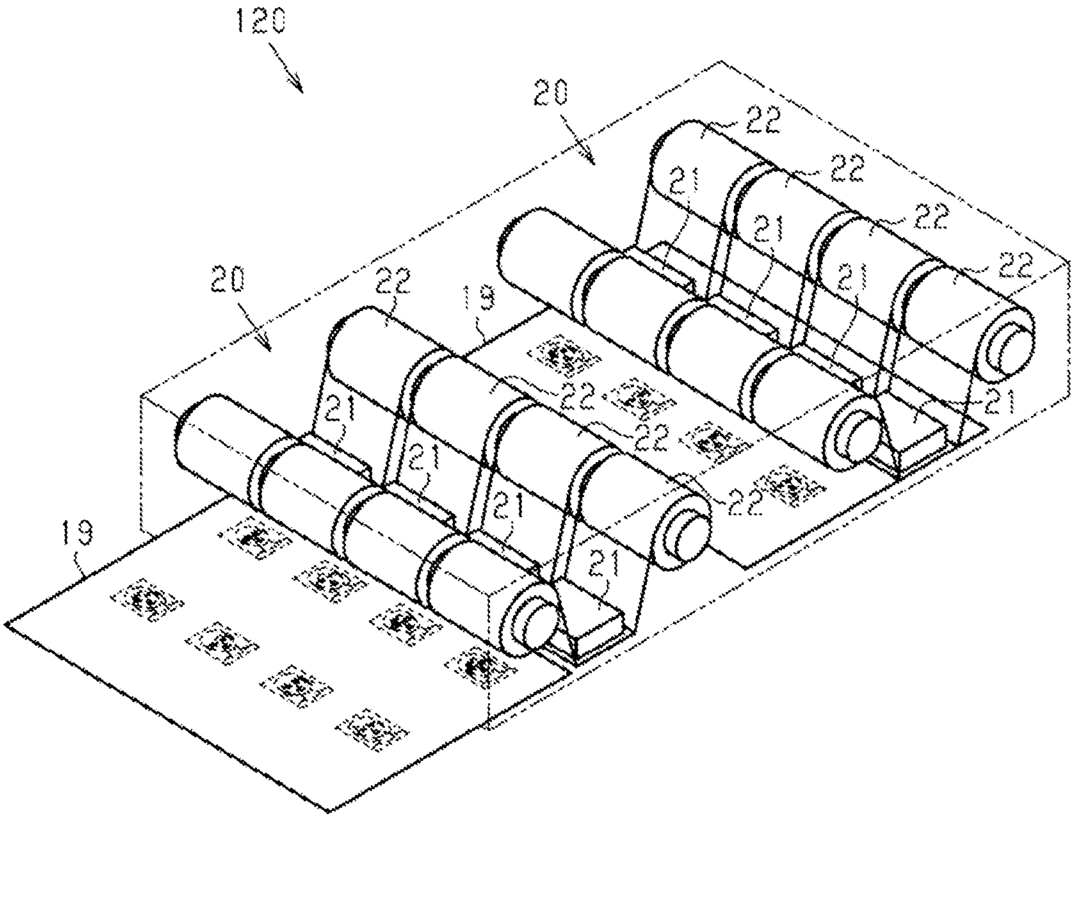
FIG. 4 is a diagram illustrating a configuration of the printing unit in the embodiment.

As illustrated in FIG. 4, the first printing unit 120 includes head rows 20 each composed of a plurality of thermal heads 21. In each head row 20, a plurality of thermal heads 21 are aligned in a row. In detail, each thermal heads 21 is supported by a support part (not illustrated) so that a plurality of thermal heads 21 are arranged and aligned in a row. The direction in which the thermal heads 21 are arranged is a direction orthogonal to the transport direction of hologram ribbons 22 used for printing and is the width direction of the hologram ribbons 22.

The first printing unit 120 includes a plurality of head rows 20, which constitute a head unit. The plurality of head rows 20 are arranged in a direction orthogonal to the direction in which the head rows 20 extend. That is, the plurality of head rows 20 are parallel to each other. In an example of the present embodiment, the first printing unit 120 includes two head rows 20 each composed of four each thermal heads 21.

Figure 5:
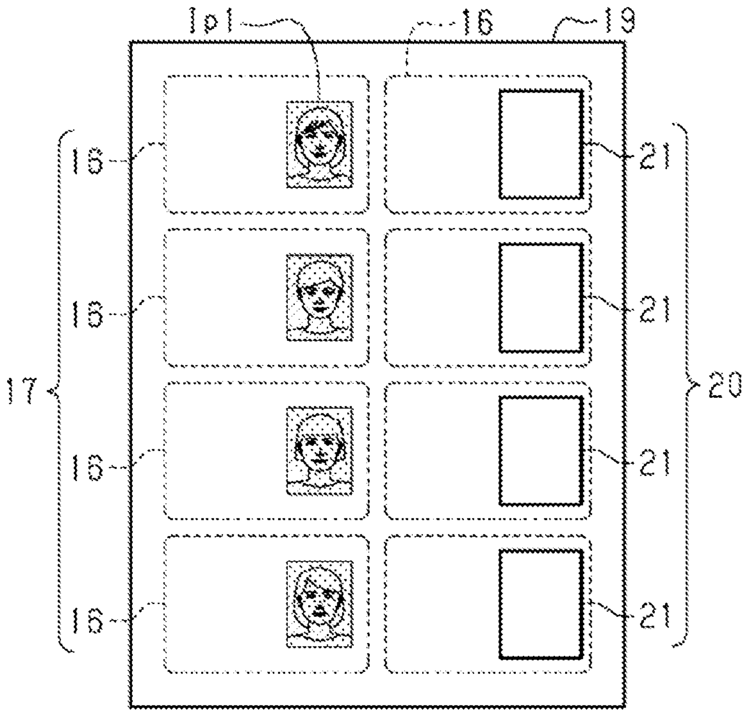
FIG. 5 is a diagram illustrating an alignment relationship between thermal heads included in the printing unit and medium regions in the embodiment.

FIG. 5 is a diagram schematically illustrating the relationship between the alignment of the medium regions 16 and the arrangement of the thermal heads 21. A sheet body 19 is the media sheet 15 during the process of production, and has the medium regions 16 and the medium region rows 17 arranged in the same manner as in the media sheet 15.

As illustrated in FIG. 5, the number of thermal heads 21 constituting one head row 20 coincides with the number of the medium regions 16 constituting one medium region row 17. The plurality of thermal heads 21 in the head row 20 are arranged so that each thermal head 21 corresponds to a respective one of the medium regions 16 constituting the medium region row 17. That is, the plurality of thermal heads 21 are arranged at intervals corresponding to intervals at which the medium regions 16 are arranged in the medium region row 17.

The thermal heads 21 include a plurality of resistive heating elements aligned in a row. The plurality of resistive heating elements are configured to selectively generate heat by being energized, and portions of the hologram ribbon 22 are pressed by the resistive heating elements having generated heat to be transferred to the sheet body 19. Thus, dots exhibiting structural color are thermally transferred from the hologram ribbon 22 onto the sheet body 19.

The hologram ribbons 22 are disposed for the respective thermal heads 21. That is, the hologram ribbons 22 assembled to the first printing unit 120 correspond in number to the thermal heads 21.

The hologram ribbon 22 is a strip-shaped sheet provided with a supporting substrate and a transfer layer. The transfer layer is pressed by the resistive heating elements of the thermal head 21 to be transferred to the sheet body 19. The transfer layer has a laminated structure including a fine structure layer in which a diffraction grating is formed, a reflective layer, a release layer, and the like. The transfer layer of the hologram ribbon 22 has red areas that include a diffractive grating emitting red diffraction light in a predetermined direction, green areas that include a diffractive grating emitting green diffraction light in a predetermined direction, and blue areas that include a diffractive grating emitting blue diffraction light in a predetermined direction. Further, in the transfer layer, the red region, the green region, and the blue region are repeatedly arranged in a predetermined order in the direction in which the hologram ribbon 22 extends.

Further, in the transfer layer, the red region, the green region, and the blue region are repeatedly arranged in a predetermined order in the direction in which the hologram ribbon 22 extends. A structural color portion 12 is thus formed that displays a color image. The diffraction gratings are configured to emit diffracted light having a predetermined wavelength in a predetermined direction with respect to the incident light, and the hologram constituting the structural color portion 12 is configured such that, for example, when it receives white light perpendicularly incident on the paper surface, an image can be observed at positions at an angle of 45 degrees to the incidence direction of the white light.

In the present embodiment, the structural color portions 12 in the plurality of medium regions 16 constituting one medium region row 17 are formed by different thermal heads 21. In other words, the first personal information Ip1 of one medium region 16 is printed by one thermal head 21, and each thermal head 21 of one head row 20 prints the first personal information Ip1 of a separate medium region 16. Thus, the first personal information Ip1 of each medium region 16 of one medium region row 17 is printed. The plurality of thermal heads 21 constituting one head row 20 performs printing simultaneously in the plurality of medium regions 16 constituting one medium region row 17.

According to the configuration of the present embodiment, compared with a form in which one thermal head 21 has a length corresponding to the plurality of medium regions 16, and a hologram ribbon 22 having a small width similar to the width of the plurality of medium regions 16 is used to collectively print the plurality of medium regions 16, it is possible to use a hologram ribbon 22 having a small width less than or equal to the width of the medium region 16. As a result of the printing being performed with hologram ribbons 22 having such a small width provided for the respective thermal heads 21, compared with the abovementioned form in which the plurality of medium regions 16 are collectively printed, unnecessary consumption of the hologram ribbon 22 in portions corresponding to the spacing between adjacent medium regions 16 is prevented.

Further, in the present embodiment, in production of one media sheet 15, one of the two head rows 20 performs printing in one of the two medium region rows 17, and the other of the two head rows 20 performs printing in the other of the two medium region rows 17. The two head rows 20 perform printing simultaneously on different sheet bodies 19. As a result, compared with a configuration in which the first printing unit 120 is provided with a single head row 20, the number of sheet bodies 19 printed per unit time increases. The efficiency of producing the media sheet 15 is thus improved.

Each of the two head rows 20 prints an information group ID on one sheet body 19. Specifically, referring to one of the head rows 20 as a first head row 20 and the other head row as a second head row 20, one thermal head 21 of the first head row 20 and one thermal head 21 of the second head row 20 each print an information group ID. Further, the position of the thermal head 21 in the first head row 20 that prints the information group ID is different from the position of the thermal head 21 in the second head row 20 that prints the information group ID. For example, the first and second head rows 20, each having a first end and a second end, may be configured so that, in the first head row 20, the second thermal head 21 from the first end prints the information group ID, while, in the second head row 20, the third thermal head 21 from the first end prints the information group ID. With this configuration, the two information group IDs are printed alongside different medium regions 16 in one medium region row 17.

The edge of each sheet body 19 may have identification information for the substrate sheet 14 thereof. For the thermal heads 21 that print the information group IDs, it is preferred that thermal heads 21 are selected which are arranged in locations that do not overlap with the identification information of the substrate sheet 14.

The structure in the vicinity of one thermal head 21 will be described with reference to FIG. 6, including the mode in which the hologram ribbon 22 and the sheet body 19 are transported.

Figure 6:
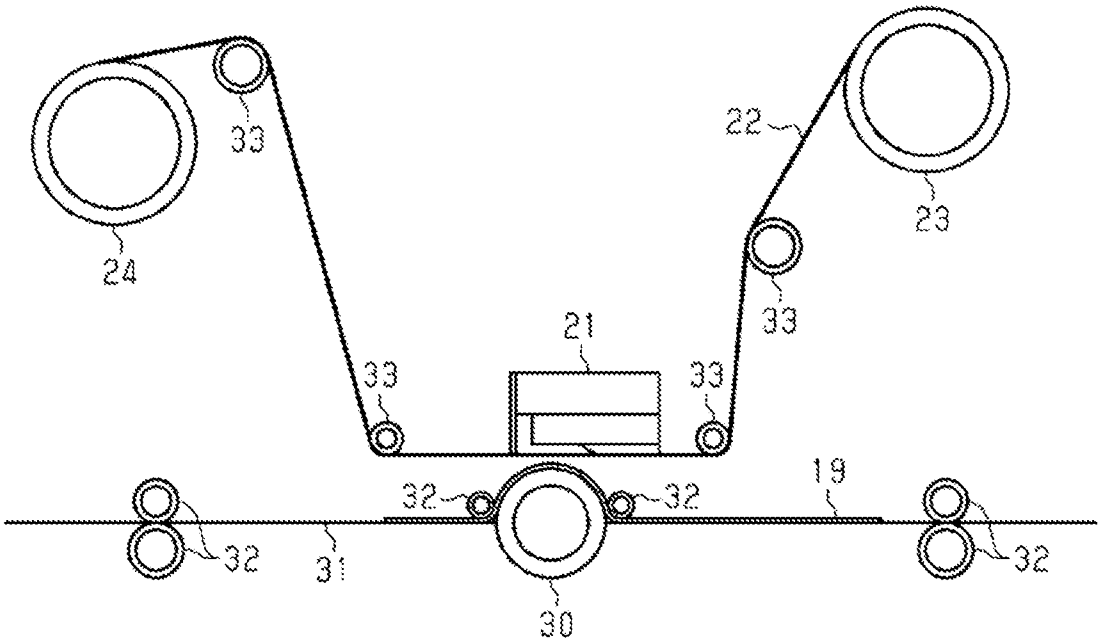
FIG. 6 is a diagram illustrating a configuration of one thermal head and its neighborhood in the printing unit in the embodiment.

As shown in FIG. 6, platen rollers 30 are disposed that face the resistive heating elements of the respective thermal heads 21. The axial direction of the platen roller 30 coincides with the direction in which the row of resistive heating elements extends. The sheet body 19 is transported in a direction orthogonal to the axial direction of the platen roller 30 and passes between the thermal head 21 and the platen roller 30 while following the surface of the platen roller 30. The sheet body 19 is transported by cooperation between a transport path 31 that supports the sheet body 19 and a plurality of rollers 32 on the transport path.

The hologram ribbon 22 is drawn out from a ribbon roll 23 on which the ribbon is wound in a roll shape, passes between the thermal head 21 and the platen roller 30, and is wound on a take-up roll 24. In the space between the thermal head 21 and the platen roller 30, the hologram ribbon 22 passes between the sheet body 19 and the thermal head 21 and is transported in a direction orthogonal to the axial direction of the platen roller 30. The width direction of the hologram ribbon 22 coincides with the direction in which the row of resistive heating elements extends. The hologram ribbon 22 is transported by cooperation between a mechanism that rotates the rolls 23 and 24 and a plurality of rollers 33 on a transport path. On the transport path of the hologram ribbon 22, a sensor is provided for determining the position of each color region of the hologram ribbon 22.

In the above-described configuration, the resistive heating elements in the thermal head 21 press the hologram ribbon 22 against the sheet body 19 on the platen roller 30 to transfer the transfer layer of the hologram ribbon 22 onto the sheet body 19. The printing by transfer is performed while the sheet body 19 and the hologram ribbon 22 are being transported in the same direction. When the transfer of the first color region is completed, the sheet body 19 is pulled back and the hologram ribbon 22 is fed so that the second color region is placed under the thermal head 21. Then, the transfer of the second color region is performed while the sheet body 19 and the hologram ribbon 22 are once again being transported in the same direction. The same movement is repeated to transfer the third color region, and this results in the formation of the structural color portion 12.

The order in which the structural color portions 12 and the ID portion 18 are formed is not limited, and the formation of the ID portion 18 is not limited to being a result of the transfer of any of the color regions. For example, one color region for forming the ID portion 18 may be transferred after each of the color regions for forming the structural color portions 12 have been transferred. Alternatively, the ID portion 18 may be formed by transferring a plurality of color regions. That is, the display color of the information group ID may be any color as long as it is a structural color, and may be a single color or a plurality of colors.

The positions of the thermal heads 21 are preferably controlled so that, during formation of the ID portion 18, the thermal head 21 in one head row 20 that is forming the ID portion 18, that is, only the thermal head 21 assigned to print the information group ID, makes contact with the hologram ribbon 22, and the other thermal heads 21 are separated from the hologram ribbon 22.

The relationship between the size of the thermal head 21 and the width of the hologram ribbon 22 will be described with reference to FIG. 7.

Figure 7:
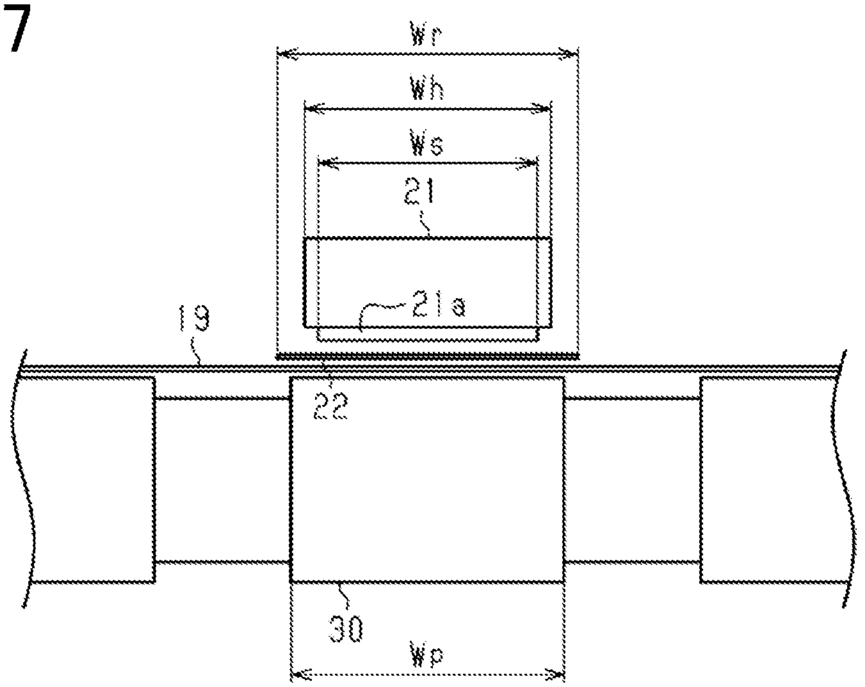
FIG. 7 is a diagram illustrating a length relationship between the thermal head and a hologram ribbon in the embodiment.

As shown in FIG. 7, the width Wr of the hologram ribbon 22 is preferably greater than the length Ws of the resistor row 21*a*, which is the row of resistive heating elements in the thermal head 21. This configuration prevents the resistor row 21*a* from making contact with the sheet body 19 outside the hologram ribbon 22 when the hologram ribbon 22 is transferred. Furthermore, the width Wr of the hologram ribbon 22 is preferably greater than the width Wh of the entire thermal head 21. This configuration prevents the edge of the thermal head 21 from making contact with the sheet body 19 outside the hologram ribbon 22 when the hologram ribbon 22 is transferred.

As a result of preventing direct contact of the resistor row 21*a* and the edge of the thermal head 21 with the sheet body 19, the formation of scratches on the sheet body 19 is prevented.

The length Ws of the resistor row 21*a* and the width Wh of the entire thermal head 21 do not have to be greater than the width of the medium region 16 as long as they are greater than the width of the structural color portion 12 to be formed. Specifically, the length Ws and the width Wh may be less than the width of the medium region 16 as long as they are greater than the width of the facial image, which is the first personal information Ip1. The configuration where the length Ws and the width Wh are less than the width of the medium region 16 enables the use of a hologram ribbon 22 having a smaller width, which further reduces unnecessary consumption of the hologram ribbon 22.

Furthermore, the width Wp of the platen roller 30 in the axial direction does not have to be greater than the width of the medium region 16 as long as it is greater than the width of the structural color portion 12 to be formed. That is, the width Wp of the platen roller 30 in the axial direction may be less than the width of the medium region 16 as long as it is greater than the width of the facial image, which is the first personal information Ip1. The width Wr of the hologram ribbon 22, the width Wp of the platen roller 30 in the axial direction, the width Wh of the entire thermal head 21, and the length Ws of the resistor row 21*a* preferably decrease in this order. The width Wh of the entire thermal head 21 may be greater than the width Wp of the platen roller 30 in the axial direction as long as it is less than the width Wr of the hologram ribbon 22.

Figure 8:
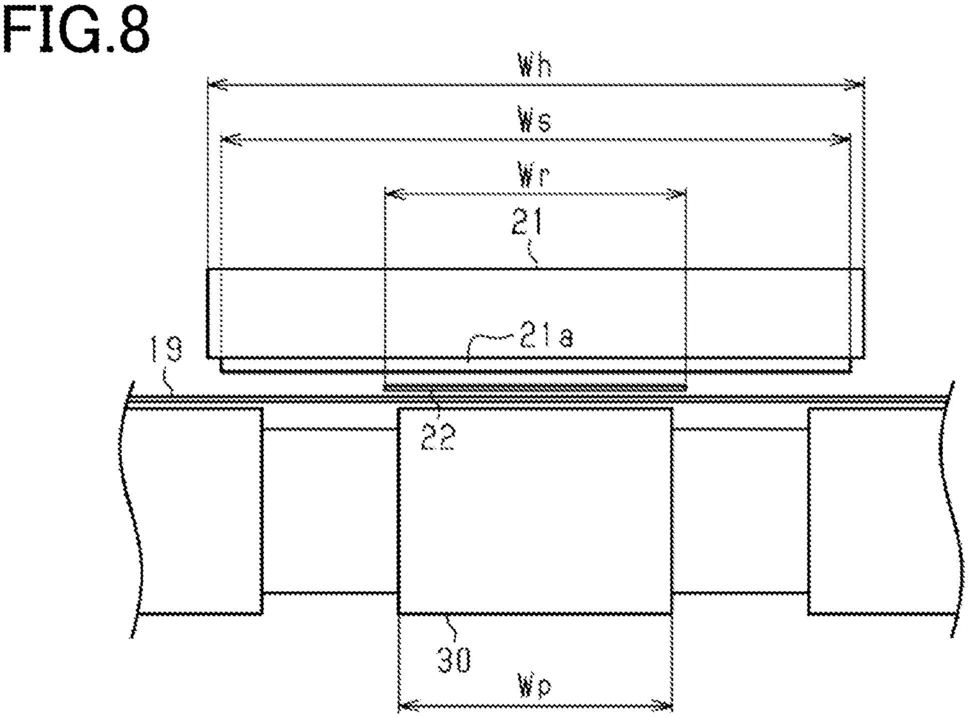
FIG. 8 is a diagram illustrating a length relationship between a thermal head and a hologram ribbon in a conventional case.

As shown in FIG. 8, even when a conventional large thermal head 21 is used, a hologram ribbon 22 having a small width can be used to reduce the amount of the hologram ribbon 22 used. However, if the width Wr of the hologram ribbon 22 is less than the length Ws of the resistor row 21*a* and the width Wh of the entire thermal head 21, as mentioned above, the sheet body 19 may become scratched due to the resistor row 21*a* or the edge of the thermal head 21 making direct contact with the sheet body 19. In contrast, by using the small-sized thermal head 21 and the small-width hologram ribbon 22, it is possible to reduce the usage of the hologram ribbon 22 while suppressing scratching of the sheet body 19.

The hardness of the platen roller 30 required for transfer of the hologram ribbon 22 is higher than the hardness of a platen roller used for the transfer of an ink ribbon having a layer made of pigment ink, or in a dye-sublimation thermal printer. Specifically, the Shore hardness of a platen roller used in a dye-sublimation thermal printer is about 50 to 60, while the Shore hardness of the platen roller 30 used in the present embodiment is 90 or more.

When the platen roller 30 is hard, slight variations in the amount of pressing by each heating element are not easily evened out. Therefore, when attempting to make the resistive heating elements press evenly, the adjustments required to even out the amount of pressing by each resistive heating element becomes more complicated as the length Ws of the resistor row 21 becomes greater. By using small thermal heads 21 for respective medium regions 16 as described in the present embodiment, the adjustments required to even out the amount of pressing by each heating element become simple.

With the configuration where a plurality of thermal heads 21 constitute a head unit, even if a defect occurs in a portion of a thermal head 21, it is possible to exchange only the defective thermal head 21 without exchanging the entire head unit. Therefore, this configuration reduces the need for large-scale work to resolve the defect.

[Electrical Configuration of the Printing System]

Figure 9:
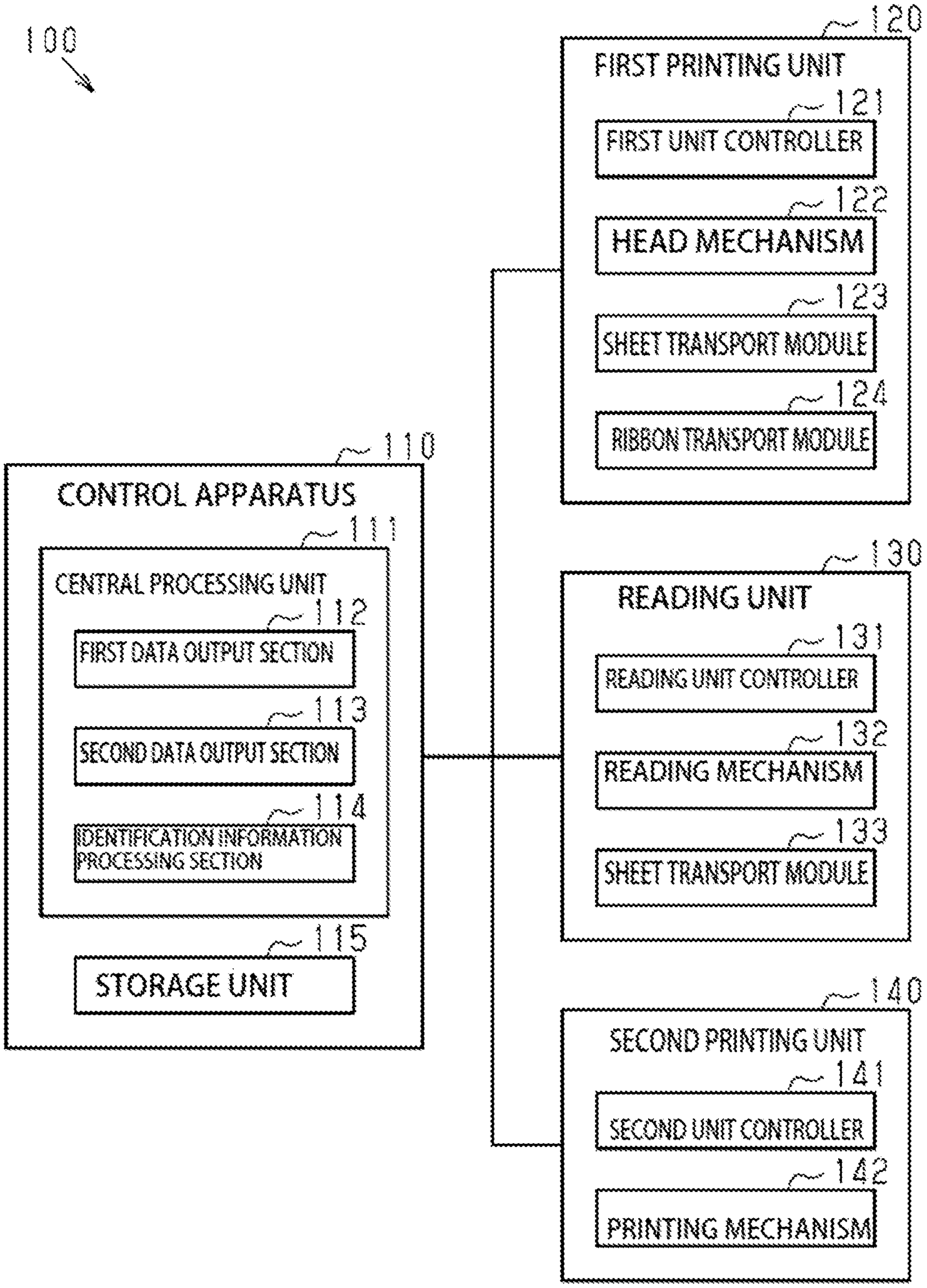
FIG. 9 is a diagram illustrating a configuration of the printing system in the embodiment.

The detailed configuration of the printing system 100 will be described with reference to FIG. 9, focusing on the electrical configuration.

The control apparatus 110 includes a central processing unit 111 and a storage unit 115. The central processing unit 111 includes a CPU and a volatile memory such as a RAM, and performs processing based on programs and data stored in the storage unit 115. The central processing unit 111 includes, as functional components, a first data output section 112, a second data output section 113, and an identification information processing section 114.

The first data output section 112 outputs first data Dt1 for forming the structural color portions 12 and the ID portions 18 to the first printing unit 120. The first data Dt1 is data for printing the plurality of pieces of first personal information Ip1 included in the first information group Gi1 in different medium regions 16, and for printing the information group ID linked to the first information group Gi1 in an area other than the medium regions 16.

Figure 10:
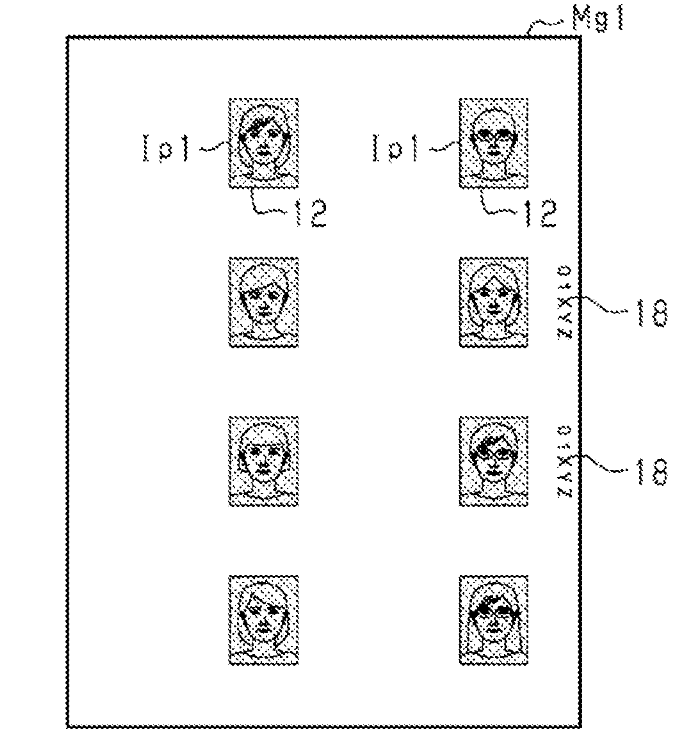
FIG. 10 is a diagram illustrating an example of images constituting first data in the printing system in the embodiment.

As shown in FIG. 10, for example, the first data Dt1 is data of an image Mg1 composed of the structural color portions 12 and the ID portions 18 of one media sheet 15, that is, data of an image Mg1 including entirety of the first personal information Ip1 included in the first information group Gi1 and the information group IDs. In the image Mg1, the plurality of pieces of first personal information Ip1 are arranged according to the arrangement of the medium regions 16, and the information group IDs are each arranged with a predetermined space relative to one of the pieces of first personal information Ip1 so that each of the information group IDs is to be alongside the corresponding medium region 16.

The first data Dt1 may be data indicating the transfer positions of areas of individual colors in the hologram ribbon 22, which is, data indicating the arrangement of dots of individual colors, or may be data capable of being converted into such data by the first printing unit 120.

The first data Dt1 is not limited to being data of one image and may be data for instructing the first printing unit 120 to perform printing by indicating the print content and print locations for each piece of first personal information Ip1 and the information group IDs.

The second data output section 113 outputs second data Dt2 for forming the pigmented portions 13 to the second printing unit 140. The second data Dt2 is data for printing each piece of second personal information Ip2 of a second information group Gi2 in a corresponding one of the medium regions 16 that has printed thereon the corresponding first personal information Ip1. The second data output section 113 outputs the second data Dt2 corresponding to the second information group Gi2 that has been identified based on reading of the information group IDs.

Figure 11:
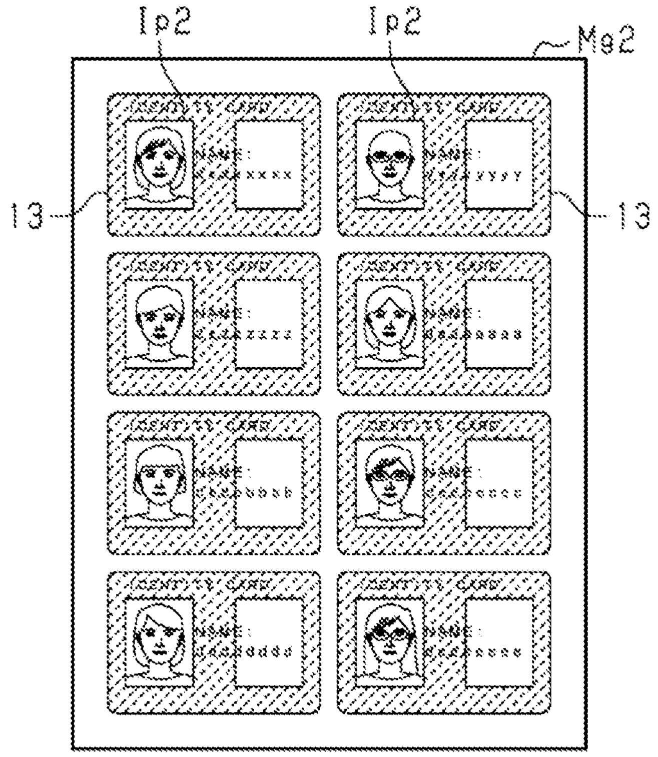
FIG. 11 is a diagram illustrating an example of images constituting second data in the printing system in the embodiment.

As illustrated in FIG. 11, the second data Dt2 is, for example, data of an image Mg2 formed of the pigmented portions 13 constituting one media sheet 15, that is, data of an image Mg2 including all pieces of the second personal information Ip2 included in the second information group Gi2. In the image Mg2, the plurality of pieces of second personal information Ip2 are arranged such that each piece of second personal information Ip2 is to be located in a corresponding one of the medium regions 16 on which the corresponding first personal information Ip1 is located.

The second data Dt2 may be data which includes color information for each pixel so that a color image can be printed.

The second data Dt2 is not limited to being data of one image and may be data for instructing the second printing unit 140 to perform printing by indicating the print content and print locations for each piece of second personal information Ip2.

The identification information processing section 114 performs a verification process using the result of reading of the information group IDs performed by the reading unit 130. The verification process includes processing that determines whether the two information group IDs match each other, processing that identifies the first information group Gi1 and the second information group Gi2 linked to the information group ID in the storage unit 115, and processing that determines whether the first data Dt1 using the identified first information group Gi1 has already been outputted to the first printing unit 120.

The storage unit 115 includes a non-volatile memory where programs and data required for processing executed by the central processing unit 111 are stored. As part of such data, the storage unit 115 stores the first information group Gi1 and the second information group Gi2 included in one media sheet 15 in correspondence with the information group ID. That is, different information group IDs are assigned to each media sheet 15 to be formed, or in other words, to each set of the first information group Gi1 and second information group Gi2. In addition, the storage unit 115 links the first personal information Ip1 and the second personal information Ip2 included in one personal information medium 10, or in other words, links the first personal information Ip1 and the second personal information Ip2 in combination for each personal information medium 10, through the information stored in the storage unit 115.

For example, the first information group Gi1 and the second information group Gi2 may be linked to an information group ID by linking the pieces of facial image data each representing first personal information Ip1 included in the first information group Gi1 with the information group ID, and the pieces of facial image data each representing second personal information Ip2 included in the second information group Gi2 with the information group ID. Alternatively, the first information group Gi1 and the second information group Gi2 may be linked to the information group ID by the image Mg1 and the image Mg2 being linked to the information group ID. Alternatively, the information group ID may be included in the image Mg1 to link the first information group Gi1 with the information group ID, and the second information group Gi2 may be linked to the information group ID may be separately.

The correspondence between the first personal information Ip1 and the second personal information Ip2 may be made by directly linking the first personal information Ip1 and the second personal information Ip2. Alternatively, the correspondence between the first personal information Ip1 and the second personal information Ip2 may be made according to the prescribed printing position of the first personal information Ip1 and the second personal information Ip2. Specifically, the configuration such that the first personal information Ip1 and the second personal information Ip2 are to be printed in the same medium region 16 may function as the link between the first personal information Ip1 and the second personal information Ip2.

For example, in the case where the image Mg1 and the image Mg2 are generated in advance and stored in the storage unit 115, the image Mg1 and the image Mg2 are generated so that the first personal information Ip1 and the second personal information Ip2 to be combined are arranged in the same medium region 16. As a result, the correspondence between the first personal information Ip1 and the second personal information Ip2 is established.

Furthermore, information defining the arrangement of each piece of first personal information Ip1 may be prepared in advance, and the first data output section 112 may use this information and pieces of facial image data each representing first personal information Ip1, to generate the image Mg1, and information defining the arrangement of each piece of second personal information Ip2 may be prepared in advance, and the second data output section 113 may use this information and pieces of facial image data each representing second personal information Ip2, to generate the image Mg2. Similarly in this case, the configuration such that the first personal information Ip1 and the second personal information Ip2 are to be arranged in the same medium region 16 according to the information defining the arrangement of each piece of first personal information Ip1 and the information defining the arrangement of each piece of second personal information Ip2 functions as the link between the first personal information Ip1 and the second personal information Ip2.

Alternatively, if data that directly links pieces of first personal information Ip1 with respective pieces of second personal information Ip2 is stored in the storage unit 115, the image Mg1 may be generated by arbitrarily setting the arrangement of the pieces of first personal information Ip1, and the image Mg2 may then be generated by determining the arrangement of the pieces of second personal information Ip2 such that the first personal information Ip1 and second personal information Ip2 linked to each other are arranged in the same medium region 16.

In short, the first data Dt1 and the second data Dt2 are configured such that the first personal information Ip1 and the second personal information Ip2 to be combined in each personal information medium 10 are printed in the identical medium region 16. Further, such first data Dt1 and second data Dt2 may be stored in the storage unit 115, or may be generated based on information stored in the storage unit 115.

The control apparatus 110 may be connected to the first printing unit 120, the reading unit 130, and the second printing unit 140 wirelessly or by wire. The control apparatus 110 includes an interface for communication with each of the first printing unit 120, the reading unit 130, and the second printing unit 140, and each section of the central processing unit 111 exchanges data with each unit through the interface.

The functions of the first data output section 112, the second data output section 113, and the identification information processing section 114 of the central processing unit 111 may be respectively implemented by various pieces of hardware such as a plurality of CPUs and memory such as a RAM, and software that causes these components to function, or may be implemented by software that provides a plurality of functions to a shared, single piece of hardware. Such software is stored in the storage unit 115 as a printing control program.

The first printing unit 120 includes a first unit controller 121, a head mechanism 122, a sheet transport module 123, and a ribbon transport module 124.

The first unit controller 121 includes a CPU and a memory, and controls the operations of the first printing unit 120. The first unit controller 121 also includes an interface for communication with the control apparatus 110 and interchanges data with the control apparatus 110 via the interface.

The head mechanism 122 is a head unit that includes head rows 20 each composed of a plurality of thermal heads 21 described above. The sheet transport module 123 is a mechanism for transporting a sheet body 19 and includes the platen rollers 30 described above, the transport path 31, the rollers 32, a motor for driving the rollers, and the like The ribbon transport module 124 is a mechanism for transporting the hologram ribbons 22 and includes the mechanism that rotates the rolls 23 and 24 described above, the rollers 33, and a motor for driving the rollers, and the like.

The first unit controller 121 receives the first data Dt1 from the control apparatus 110. The first unit controller 121 outputs signals to the thermal heads 21 of each head row 20, drives the sheet transport module 123 to transport the sheet body 19, and drives the ribbon transport module 124 to transport the hologram ribbons 22 so that printing based on the first data Dt1 is performed.

The plurality of thermal heads 21 included in one head row 20 can be driven in synchronization with each other. The plurality of platen rollers 30 facing the respective thermal heads 21 can be driven in synchronization with each other, and the plurality of hologram ribbons 22 assembled to the respective thermal heads 21 can be transported in synchronization with each other.

The first unit controller 121 outputs, to each thermal head 21, data indicating the print content for the corresponding thermal head 21, based on, for example, the first data Dt1. Specifically, the first unit controller 121 divides the print content indicated by the first data Dt1 into a plurality of regions and assigns the data regions to the respective thermal heads 21 according to the arrangement of the plurality of thermal heads 21, and outputs the assigned pieces of data to the respective thermal heads 21. As a result, the parts of the first data Dt1 that correspond to respective medium regions 16 are outputted to the respective thermal heads 21 each responsible for printing on the corresponding medium region 16. Each thermal head 21 includes a controller that controls energization of the resistive heating elements in the thermal head 21. The controller of each thermal head 21 converts the data supplied from the first unit controller 121 into data for forming a color image using a hologram composed of dots of three colors. Then, the controller of each thermal head 21 controls energization of the resistive heating elements based on the converted data, so that dots of each color are transferred from the hologram ribbon 22 onto the sheet body 19.

In the above-described configuration, the first data Dt1 and the data outputted from the first unit controller 121 to the thermal heads 21 are provided in the same format as general image data. These data are converted by the control units of the thermal heads 21 into data for forming color facial images by holograms, for example, data including arrangement of dots of the individual colors. Such conversion involves a heavy computational burden, and thus data conversion requires a larger amount of time as the conversion target area is larger. In comparison to a conventional configuration in which one thermal head 21 performs printing simultaneously in the plurality of medium regions 16, the configuration in which one thermal head 21 performs printing in one medium region 16 decreases the size of an area where one thermal head 21 performs printing, that is, the size of an area requiring computational operations in one thermal head 21. This shortens the time for data conversion, thereby decreasing the time between receipt of the first data Dt1 from the control apparatus 110 by the first printing unit 120 and the completion of the printing. Therefore, it is possible to increase the number of sheet bodies 19 printable per unit time by the first printing unit 120.

The reading unit 130 includes a reading unit controller 131, a reading mechanism 132, and a sheet transport module 133.

The reading unit controller 131 includes a CPU and a memory, and controls the operations of the reading unit 130. The reading unit controller 131 also includes an interface for communication with the control apparatus 110 and interchanges data with the control apparatus 110 via the interface.

The reading mechanism 132 is a mechanism for reading the information group IDs printed by the first printing unit 120. The reading mechanism 132 includes an irradiation unit that irradiates the ID portions 18 with light for reproduction and an image capturing unit that captures a reproduced image.

The sheet transport module 133 is a mechanism for transporting the sheet body 19 and includes a transport path that supports the sheet body 19, rollers, a motor for driving the rollers, and the like.

When the sheet body 19 has been delivered from the first printing unit 120, the reading unit controller 131 drives the reading mechanism 132 and the sheet transport module 133 to capture an image of the information group IDs printed on the sheet body 19 and read the information group IDs. Then, the reading unit controller 131 then transmits the acquired information to the control apparatus 110. Specifically, the reading unit controller 131 may recognize the information group IDs by analyzing the images captured by the reading mechanism 132 and transmit the recognized information group IDs as the acquired information to the control apparatus 110. Alternatively, the reading unit controller 131 may transmit the data of the images captured by the reading mechanism 132 as the acquired information to the control apparatus 110, and the identification information processing section 114 of the control apparatus 110 may recognize the information group IDs by analyzing the images.

The second printing unit 140 includes a second unit controller 141 and a printing mechanism 142.

The second unit controller 141 includes a CPU and memory and controls the operation of the second printing unit 140. The second unit controller 141 includes an interface for communication with the control apparatus 110 and interchanges data with the control apparatus 110 via the interface.

The printing mechanism 142 is a mechanism for performing printing using a colored material. When, for example, the second printing unit 140 functions as a laser printer, the printing mechanism 142 includes a photosensitive drum, a laser irradiation unit, a toner supply unit, a mechanism such as a roller that performs processes such as charging, transfer, and fixing, and a mechanism that transports the sheet body 19.

The second unit controller 141 receives the second data Dt2 from the control apparatus 110 and drives the printing mechanism 142 to perform printing based on the second data Dt2.

The central processing unit 111 of the control apparatus 110 may perform some or all of the functions of the first unit controller 121, the reading unit controller 131, and the second unit controller 141 described above. That is, the control apparatus 110 may directly control the operation of the first printing unit 120, the reading unit 130, and the second printing unit 140.

Figure 12:
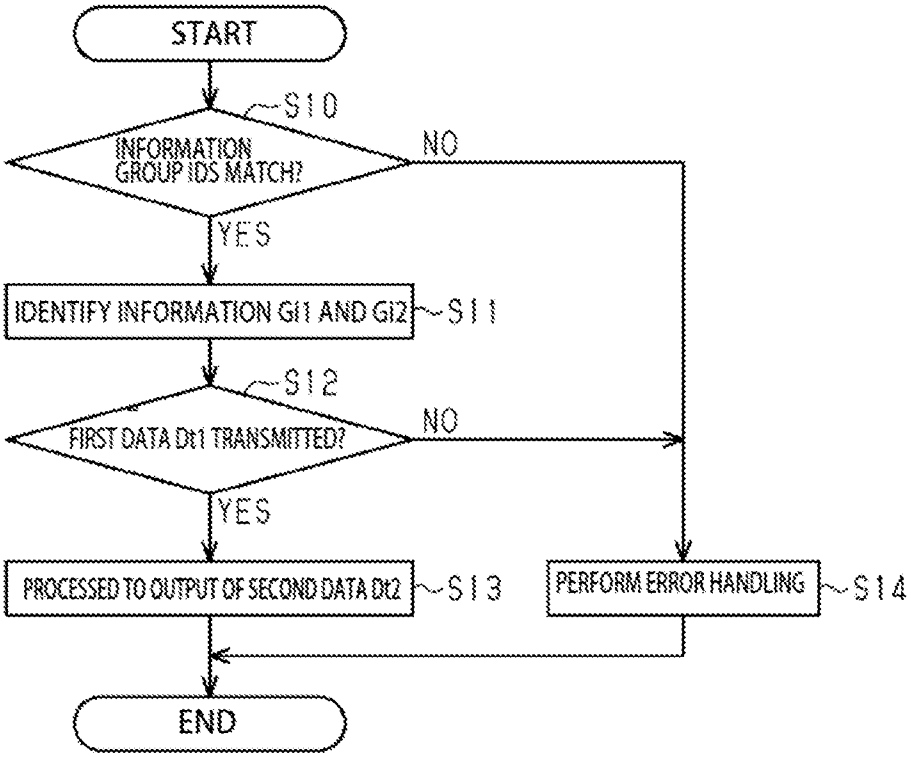
FIG. 12 is a flowchart of a procedure for verification processing performed by the printing system in the embodiment.

With reference to FIG. 12, the verification processing performed by the identification information processing section 114 of the control apparatus 110 will be described in detail.

When acquiring two information group IDs based on the information received from the reading unit 130, the identification information processing section 114 starts the verification processing. FIG. 12 is a flowchart of a procedure of the verification processing.

First, in step S10, the identification information processing section 114 determines whether the two acquired information group IDs match each other. If a positive determination is made at step S10, it is confirmed that the combination of pieces of first personal information Ip1 of the two medium region rows 17 printed by the different head rows 20 is correct, that is, that the first information group Gi1 has been printed as indicated by the first data Dt1.

When the two information group IDs match each other (i.e., positive determination at step S10), the process proceeds to step S11 at which the identification information processing section 114 identifies the first information group Gi1 and the second information group Gi2 that are linked to the information group ID in the storage unit 115.

Next, as the processing at step S12, the identification information processing section 114 determines whether the first information group Gi1 identified in the processing at step S11 is the first information group Gi1 used for the first data Dt1 that has been outputted to the first printing unit 120. The first data output section 112 stores information on the first data Dt1 outputted to the first printing unit 120 as a log in the storage unit 115, and the identification information processing section 114 makes the determination at step S12 by referring to the log.

If a positive determination is made at step S12, it is confirmed with certainty that the first printing unit 120 has been instructed to perform the printing of the first information group Gi1 corresponding to the information group IDs acquired from the sheet body 19. Thus, it is confirmed that the sheet body 19 targeted for reading by the reading unit 130 is a sheet body 19 that has been delivered to the reading unit 130 by the correct procedure, or in other words, a sheet body 19 on which the pieces of first personal information Ip1 have already been printed, and the pieces of second personal information Ip2 are to be printed next.

In step S12, the identification information processing section 114 may determine whether the elapsed time from the outputting of the first data Dt1 using the first information group Gi1 corresponding to the information group ID is within a predetermined range. The predetermined range is set to a reasonable range of time from the outputting of the first data Dt1 through the printing by the first printing unit 120 to the arrival of the sheet body 19 at the reading unit 130. This makes it possible to verify more accurately that the sheet body 19 has been correctly fed to the reading unit 130.

In step S12, the identification information processing section 114 may determine whether it is appropriate that the sheet body 19 as a target of reading by the reading unit 130 reaches the reading unit 130 at that point in time, by comparing the reading order of the information group IDs including the information group IDs read earlier with the outputting order of the first data Dt1.

If it is determined in the processing at step S12 that the first data Dt1 using the identified first information group Gi1 has already been outputted to the first printing unit 120 (i.e., positive determination at step S12), the process proceeds to step S13. As the processing at step S13, the identification information processing section 114 passes control to the second data output section 113 so that it outputs second data Dt2, and then ends the verification process. After taking over control, the second data output section 113 outputs, to the second printing unit 140, the second data Dt2 corresponding to the second information group Gi2 identified by the identification information processing section 114 in the processing at step S11.

If it is determined in the processing at step S10 that the two information group IDs do not match (i.e., negative determination at step S10), or if it is determined in the processing at step S12 that the first data Dt1 using the identified first information group Gi1 has not been outputted to the first printing unit 120 (i.e., negative determination at step S12), error handling is performed as the processing at step S14. In this case, the processing is not passed to the second data output section 113 and the second data Dt2 is not outputted to the second printing unit 140. The error handling may include, for example, transmission of an error signal to the reading unit 130 or external notification of the error.

[Operations of the Printing System]

The operations of the printing system 100 will be described with reference to FIGS. 13 and 14.

Figure 13:
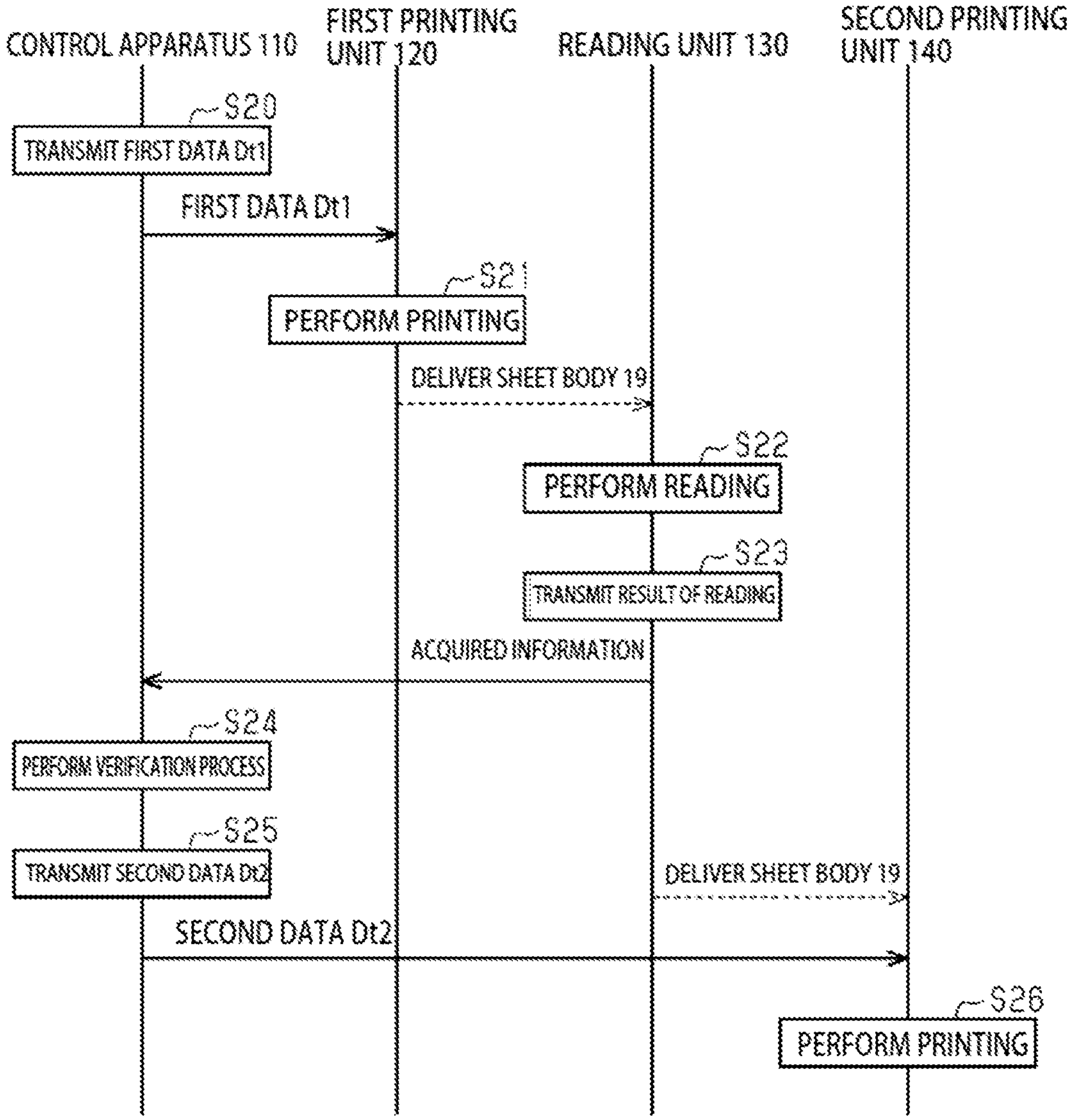
FIG. 13 is a sequence diagram illustrating a procedure for operations of the printing system in the embodiment.
Figure 14C:
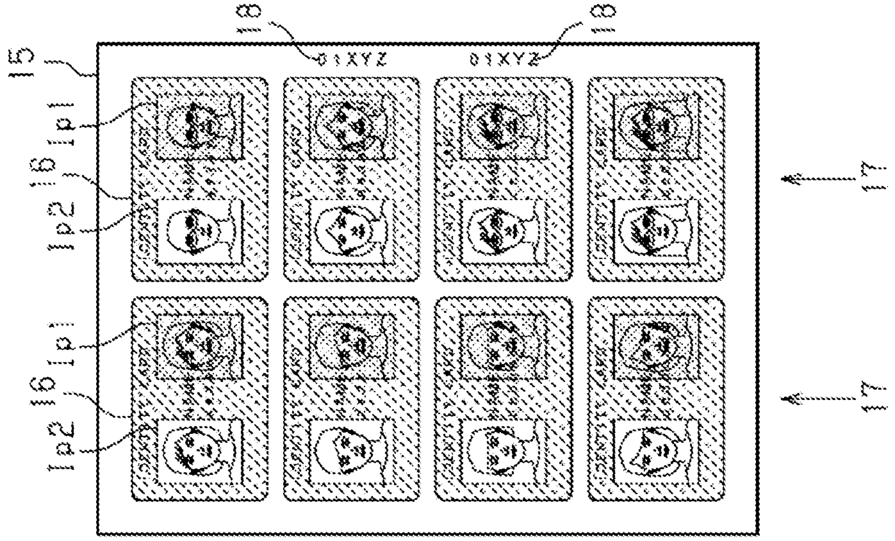
FIGS. 14(*a*), 14(*b*), and 14(*c*) are diagrams illustrating a process of production of a media sheet by the printing system in an embodiment.
Figure 14B:
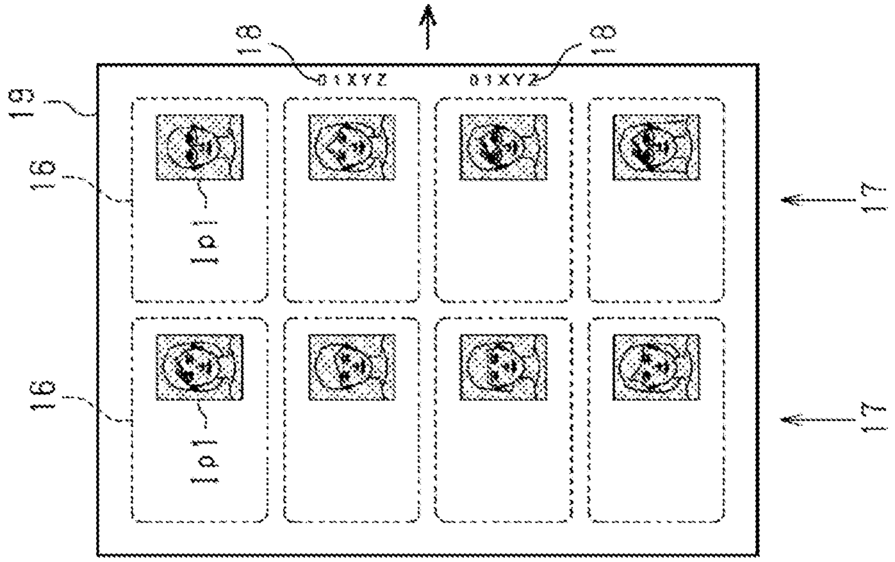
Figure 14A:
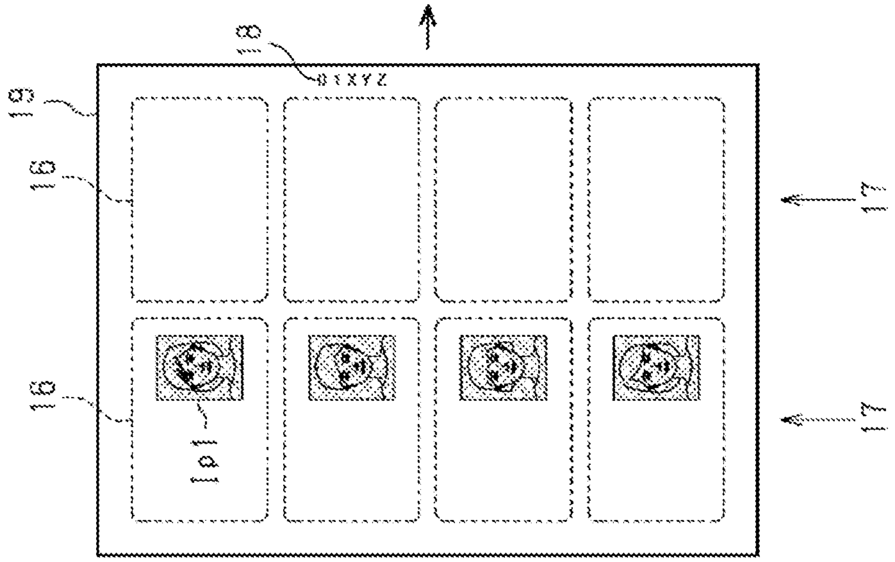

As illustrated in FIG. 13, when the production of the media sheet 15 is started, the control apparatus 110 transmits the first data Dt1 corresponding to the media sheet 15 to be produced to the first printing unit 120 (step S20).

In response to receiving the first data Dt1, the first printing unit 120 takes in a substrate sheet 14 and performs printing based on the first data Dt1 (step S21).

Specifically, first, the first head row 20 prints on the first medium region row 17 and prints the information group ID. Consequently, as shown in FIG. 14(*a*), the pieces of first personal information Ip1 are printed on the respective medium regions 16 constituting the first medium region row 17, and one information group ID is printed. Thus, the sheet body 19 is in a state where the pieces of first personal information Ip1 of one medium region row 17 and one information group ID have been printed.

Then, the second head row 20 prints on the second medium region row 17 and prints the information group ID. Consequently, as shown in FIG. 14(*b*), the pieces of first personal information Ip1 are printed on the respective medium regions 16 constituting the second medium region row 17, and one information group ID is printed. Thus, the sheet body 19 is in a state where the pieces of first personal information Ip1 of two medium region rows 17 and two information group IDs have been printed, whereby printing according to the first data Dt1 is completed.

When printing by the first printing unit 120 is completed, the sheet body 19 is delivered from the first printing unit 120 to the reading unit 130. This delivery of the sheet body 19 may be performed, for example, based on signals transmitted between the control apparatus 110 and the first printing unit 120 and reading unit 130. That is, a signal indicating the progress of printing by the first printing unit 120 and a signal indicating the progress of reading by the reading unit 130 are transmitted from the respective units 120 and 130 to the control apparatus 110, and based on these signals, the control apparatus 110 instructs the units 120 and 130 to deliver the sheet body 19 at an appropriate timing. The sheet body 19 is delivered as a result of the units 120 and 130 driving the sheet transport modules 123 and 133, respectively, according to instructions from the control apparatus 110.

Note that, if communication is possible between the first printing unit 120 and the reading unit 130, the units 120 and 130 may exchange signals without them going through the control apparatus 110 to deliver the sheet body 19. Furthermore, the sheet body 19 may be delivered manually.

Upon receipt of the sheet body 19, the reading unit 130 reads the information group IDs from the sheet body 19 (step S22), and transmits the acquired information to the control apparatus 110 (step S23).

Upon receipt of the acquired information, the control apparatus 110 performs the verification processing described above with reference to FIG. 12 (step S24). When the verification processing has completed without problem and the identification information processing section 114 has passed the processing to the second data output section 113, the control apparatus 110 transmits the second data Dt2 of the second information group Gi2 linked to the information group ID to the second printing unit 140 (step S25). If the verification processing has ended with error handling, step S25 and the subsequent steps will not be performed and the second data Dt2 will not be transmitted to the second printing unit 140.

Upon completion of the verification processing, the reading unit 130 delivers the sheet body 19 to the second printing unit 140. The delivery of the sheet body 19 may be performed, for example, based on signals transmitted between the control apparatus 110 and the reading unit 130 and second printing unit 140. For example, upon completion of reading by the reading unit 130, the control apparatus 110 may instruct the units 130 and 140 to deliver the sheet body 19. The delivery of the sheet body 19 is performed as a result of the units 130 and 140 driving the sheet transport module 133 and the printing mechanism 142, respectively, according to instructions from the control apparatus 110. When the verification processing by the control apparatus 110 has ended with error handling, for example, the second printing unit 140 discharges the delivered sheet body 19. Note that, if communication is possible between the reading unit 130 and the second printing unit 140, the units 130 and 140 may exchange signals without them going through the control apparatus 110 to perform delivery of the sheet body 19.

Alternatively, the control apparatus 110 may instruct the units 130 and 140 to deliver the sheet body 19 only when the verification process is completed at the control apparatus 110 without error. In this case, if the verification process ends with error handling, the sheet body 19 is not delivered, and the sheet body is discharged by the reading unit 130.

Upon receipt of the second data Dt2, the second printing unit 140 performs printing based on the second data Dt2 (step S26). Accordingly, as illustrated in FIG. 14(*c*), the pigmented portions 13 are formed in the medium regions 16 constituting the medium region rows 17. That is, the second personal information Ip2 is printed in all the medium regions 16. Thus, the production of the media sheet 15 is completed.

For production of a legitimate personal information medium, the personal information in the colored region and the personal information in the structural color region need to be personal information of the same person. In other words, the combination of the first personal information Ip1 and second personal information Ip2 needs to be a combination of predetermined pieces of personal information. In the present embodiment, one media sheet 15 is used to collectively produce different personal information media 10, and personal information is printed twice, once by the first printing unit 120 and once by the second printing unit 140, during production thereof. In such a configuration, management of combinations of personal information to be printed is an important issue.

According to the printing system 100 of the present embodiment, in the control apparatus 110, the first information group Gi1 and the second information group Gi2 for forming one media sheet 15 are linked to an information group ID, and the correspondence between the first personal information Ip1 and the second personal information Ip2 constituting one personal information medium 10 is made. Further, based on reading of the information group IDs printed together with the first information group Gi1, the second data Dt2 is outputted for printing the second information group Gi2 according to the combination of pieces of personal information for each personal information medium 10. In this way, by linking the first information group Gi1 and second information group Gi2 to be separately printed using the information group ID, the combinations of personal information are accurately managed, thereby enhancing the accuracy of the combinations of personal information to be printed.

As above, according to the foregoing embodiment, the following advantageous effects can be obtained:

(1) Each head row 20 of the first printing unit 120 is provided with a plurality of thermal heads 21, and the plurality of thermal heads 21 of each head row 20 are arranged so that the thermal heads 21 correspond to the respective medium regions 16 constituting the medium region row 17.

According to the above configuration, the individual thermal heads 21 perform printing on the respective medium regions 16 constituting the medium region row 17. This enables the use of a hologram ribbon 22 having a small width similar to the width of the medium region 16. As a result of the printing being performed with hologram ribbons 22 having such a small width provided for the respective thermal heads 21, unnecessary consumption of the hologram ribbon 22 in portions corresponding to the spacing between adjacent medium regions 16 is prevented.

In the mode where one media sheet 15 is used to collectively produce the plurality of personal information media 10, employing the foregoing configuration preferably reduces the usage of the hologram ribbons 22 in producing a large number of personal information media 10, thereby obtaining high effectiveness in reducing the usage of the hologram ribbons 22.

(2) The ribbon transport module 124 of the first printing unit 120 is configured to transport a hologram ribbon 22 having a width Wr greater than the length Ws of the row of resistive heating elements provided in the thermal head 21. This configuration prevents the resistor row 21*a* from making contact with the sheet body 19 outside the hologram ribbon 22 when the hologram ribbon 22 is transferred. Thus, the formation of scratches on the sheet body 19 is prevented.

Furthermore, in a form where the ribbon transport module 124 transports a hologram ribbon 22 having a width Wr greater than the width Wh of entire the thermal head 21, the edge of the thermal head 21 is prevented from making contact with the sheet body 19 outside the hologram ribbon 22. This also prevents the formation of scratches on the sheet body 19.

(3) Since the first printing unit 120 is provided with a plurality of head rows 20, the number of sheet bodies 19 printed per unit time by the first printing unit 120 can be increased by printing pieces of first personal information Ip1 using the plurality of head rows 20. Because the speed of thermal transfer printing using the hologram ribbon 22 is lower than the speed of printing using a colored material of a laser printer and the like, the efficiency of producing the media sheet 15 can be reliably increased by increasing the number of sheet bodies 19 printed per unit time by the first printing unit 120.

(4) Each thermal head 21 includes a controller that controls energization of the resistive heating elements in the thermal head 21. The controller converts the image data in the first data Dt1 that corresponds to one medium region 16 into data for forming a color image using dots exhibiting structural color, and controls the energization based on the converted data. As a result, the thermal head 21 thermally transfers the dots from the hologram ribbon 22 onto the sheet body 19.

Compared with a configuration in which one thermal head 21 collectively prints on a plurality of medium regions 16, the above configuration reduces the size of the region printed on by one thermal head 21, that is, the size of the region requiring data conversion for one thermal head 21. Consequently, the above configuration shortens the time required for data conversion, thereby increasing the number of sheet bodies 19 printed per unit time by the first printing unit 120.

(5) Based on reading of the information group IDs printed together with the first information group Gi1, and the correspondence between the information group ID and the first and second information groups Gi1 and Gi2, second data Dt2 is outputted for printing the second information group Gi2 according to the combination of pieces of personal information for each personal information medium 10. Therefore, the accuracy of combinations of printing personal information can be increased.

(6) The first head row 20 prints the plurality of pieces of first personal information Ip1 included in the first information group Gi1 and the information group ID, and the second head row 20 prints the plurality of pieces of second personal information Ip1 included in the first information group Gi1 and the information group ID. The position of the information group ID printed by the first head row 20 and the position of the information group ID printed by the second head row 20 are different from each other.

According to the foregoing configuration, even in the mode where the plurality of pieces of first personal information Ip1 are separately printed by the plurality of head rows 20, comparing the information group IDs printed by the head rows 20 makes it possible to verify that the plurality of pieces of first personal information Ip1 printed on one sheet body 19 are the plurality of pieces of first personal information Ip1 in the same first information group Gi1, that is, the plurality of pieces of first personal information Ip1 printed on one sheet body 19 are the plurality of pieces of first personal information Ip1 to be included in one media sheet 15.

(7) As a step in the verification process, the identification information processing section 114 of the control apparatus 110 determines whether the information group ID printed by the first head row 20 and the information group ID printed by the second head row 20 match each other. When this determination is positive, the second data output section 113 outputs, to the second printing unit 140, second data Dt2 based on the second information group Gi2 that has been identified as the second information group Gi2*t* linked to the matched information group IDs.

According to the above configuration, it can be confirmed that the pieces of first personal information Ip1 separately printed by the first head row 20 and the second head row 20 are pieces of first personal information Ip1 belonging to the same first information group Gi1, that is, pieces of first personal information Ip1 to be included in one media sheet 15. Since the second data Dt2 is outputted after the confirmation, the accuracy in forming the media sheet 15 can be improved.

(8) As a step in the verification process, the identification information processing section 114 determines whether the first information group Gi1 linked to the information group IDs read from the sheet body 19 is the first information group Gi1 used for the first data Dt1 having been outputted to the first printing unit 120. When this determination is positive, the second data output section 113 outputs, to the second printing unit 140, second data Dt2 based on the second information group Gi2 that has been identified as the second information group Gi2 linked to the information group IDs above.

According to the above configuration, it can be confirmed that the sheet body 19 targeted for reading of the information group IDs is a sheet body 19 that has been delivered to the reading unit 130 by the correct procedure, that is, a sheet body 19 on which the pieces of first personal information Ip1 have already been printed, and the pieces of second personal information Ip2 are to be printed next. Since the second data Dt2 is outputted after the confirmation, the accuracy in forming the media sheet 15 can be improved.

(9) The reading unit 130, which reads the information group IDs from the sheet body 19, is provided separately from the first printing unit 120 and the second printing unit 140, which perform printing. Consequently, compared with the case where a reading unit that reads the information group ID is provided in a unit that performs printing, the configuration of a unit that performs printing is simplified. Therefore, for example, the first printing unit 120 and the second printing unit 140 can be configured by making minor improvements to a conventionally used printing mechanism.

(10) The first personal information Ip1 and the second personal information Ip2 each include a facial image, and the thermal head 21 prints the facial image. The personal information medium 10 having such a combination of items of personal information has a strong anti-counterfeiting effect. Further, because the accuracy is improved in the combination of items of personal information printed when producing the personal information medium 10 having a strong anti-counterfeiting effect, the printing system 100 is highly useful.

[Modifications]

The above embodiment can be implemented with modifications as described below.

The media sheet 15 has the medium region rows 17 formed of the plurality of medium regions 16. However, the number of the medium region row(s) 17 included in the media sheet 15 and the number of the medium regions 16 constituting the medium region row(s) 17 may be different from those in the above embodiment.

The number of the head row(s) 20 included in the first printing unit 120 may be different from that in the above embodiment. For example, the first printing unit 120 may include one head row 20, and the one head row 20 may perform printing in the plurality of medium region rows 17.

The first printing unit 120 may print only one information group ID or three or more information group IDs, regardless of the number of the head row(s) 20.

The information group IDs are recognizable using image analysis or optical reading, and may be printed not only in a string of characters or numbers but also in a code form such as barcode. The reading mechanism 132 of the reading unit 130 is capable of reading the information group IDs in accordance with the form of the information group IDs. If the information group IDs are each printed in a string of characters or numbers, the user of the printing system 100 can read the information group using their own eyes. Therefore, for example, if the media sheet 15 is to be re-issued due to a defect or the like, the media sheet 15 to be re-issued can be specified by the information group ID read by the user.

The structural color portions 12 may not be hologram parts as long as they are formable by thermal transfer printing. For example, the structural color portions 12 may be parts on which the transfer layer exhibiting a structural color on a principle different from a hologram is transferred as dots from a ribbon. That is, the thermal heads 21 in the first printing unit 120 are configured to thermally transfer the dots exhibiting a structural color from the transfer ribbons onto the target sheet body 19.

The first personal information Ip1 and the second personal information Ip2 may be personal information different from facial images. The first personal information Ip1 and the second personal information Ip2 may be printed in a single color.

The first printing unit 120 may print the first personal information Ip1 and the information group ID using a material containing a pigment, and the second printing unit 140 may print the second personal information Ip2 using a material exhibiting a structural color. That is, after the printing of the personal information using a material containing a pigment, the printing of the personal information using a material exhibiting a structural color may be performed. In this case, the first data Dt1 outputted by the control apparatus 110 to the first printing unit 120 is data for printing the plurality of pieces of first personal information Ip1 included in the first information group Gi1 in different medium regions 16, and for printing the information group ID linked to the first information group Gi1 in an area other than the medium regions 16. The first printing unit 120 performs printing based on the first data Dt1. The reading unit 130 is capable of reading the information group IDs printed using a material containing a pigment from the sheet body 19, and the control apparatus 110 identifies the second information group Gi2 linked to the read information group IDs. The second data Dt2 outputted by the control apparatus 110 to the second printing unit 140 is data for printing the plurality of pieces of second personal information Ip2 included in the identified second information group Gi2 in the medium regions 16 on which the first personal information Ip1 liked to the second personal information Ip2 has been printed. The second printing unit 140 performs printing based on the second data Dt2.

The reading unit 130 may not be provided and either the first printing unit 120 or the second printing unit 140 may include the function of reading the information group IDs. Then, the sheet body 19 may be delivered from the first printing unit 120 to the second printing unit 140. Otherwise, the printing system 100 may not have the function of reading the information group IDs, and the first information group Gi1 and the second information group Gi2 may not be linked to each other using the information group IDs. In this case, the information group IDs are not printed.

The personal information medium 10 is not limited to being a card shape as long as it can be formed using multiple imposition, and may be a book such as a passport. The medium regions 16 of the media sheet 15 may correspond to part or all of the respective personal information media 10, and the medium regions 16 may serve as a component of the respective personal information media 10.

The control apparatus 110 is not limited to being an apparatus that performs all the processes by software. For example, the control apparatus 110 may include a dedicated hardware circuit (for example, an application-specific integrated circuit, or ASIC) that performs hardware processing for at least some of the processes performed by the apparatus. That is, the control apparatus 110 may be configured as circuitry that includes: (1) one or more processors that operate according to a computer program (software); (2) one or more dedicated hardware circuits that execute at least some of various processes; or (3) a combination of these. The processor may include a CPU and a memory, such as a RAM and a ROM, and the memory may store program codes or instructions that are configured to cause the CPU to perform processes. The memory, which is a computer-readable medium, may be any usable medium that is accessible by a general purpose or dedicated computer.

REFERENCE SIGNS LIST

Dt1 . . . First data; Dt2 . . . Second data; Gi1 . . . First information group; Gi2 . . . Second information group; Ip1 . . . First personal information; Ip2 Second personal information; 10 . . . Personal information medium; 11 . . . Support; 12 . . . Structural color portion; 13 . . . Pigmented portion; 14 . . . Base sheet; 15 . . . Media sheet; 16 . . . Medium region; 17 . . . Medium region row; 18 . . . ID portion; 19 . . . Sheet body; 20 . . . Head row; 21 . . . Thermal head; 21*a* . . . Resistance element row; 22 . . . Hologram ribbon; 30 . . . Platen roller; 100 . . . Printing system; 110 . . . Control apparatus; 111 . . . Central processing unit; 112 . . . First data output section; 113 . . . Second data output section; 114 . . . Identification information processing section; 115 . . . Storage unit; 120 . . . First printing unit; 130 . . . Reading unit; 140 . . . Second printing unit.

What is claimed is:

1. A head unit used for production of a media sheet that has a medium region row including a plurality of medium regions, the medium regions being to be separate personal information media, the head unit, comprising:

a plurality of thermal heads configured to thermally transfer dots exhibiting structural color from individual ribbons to respective targets, and the plurality of thermal heads being arranged so that each of the thermal heads corresponds to a respective one of the medium regions constituting the medium region row.

2. A printing unit, comprising:

the head unit according to claim 1;

platen rollers facing the respective thermal heads; and a ribbon transport module configured to transport the ribbons between the respective thermal heads and platen rollers.

3. The printing unit of claim 2, wherein the ribbon transport module is configured to transport the ribbons each having a width larger than a length of a row of resistive heating elements included in the thermal heads.

4. The printing unit of claim 2, wherein the plurality of thermal heads constitutes a head row, and the head unit includes a plurality of the head rows aligned in parallel.

5. The printing unit of claim 2, wherein the thermal heads are used for printing facial images in the medium regions.

* * * * *